UNITED STATES PATENT OFFICE.

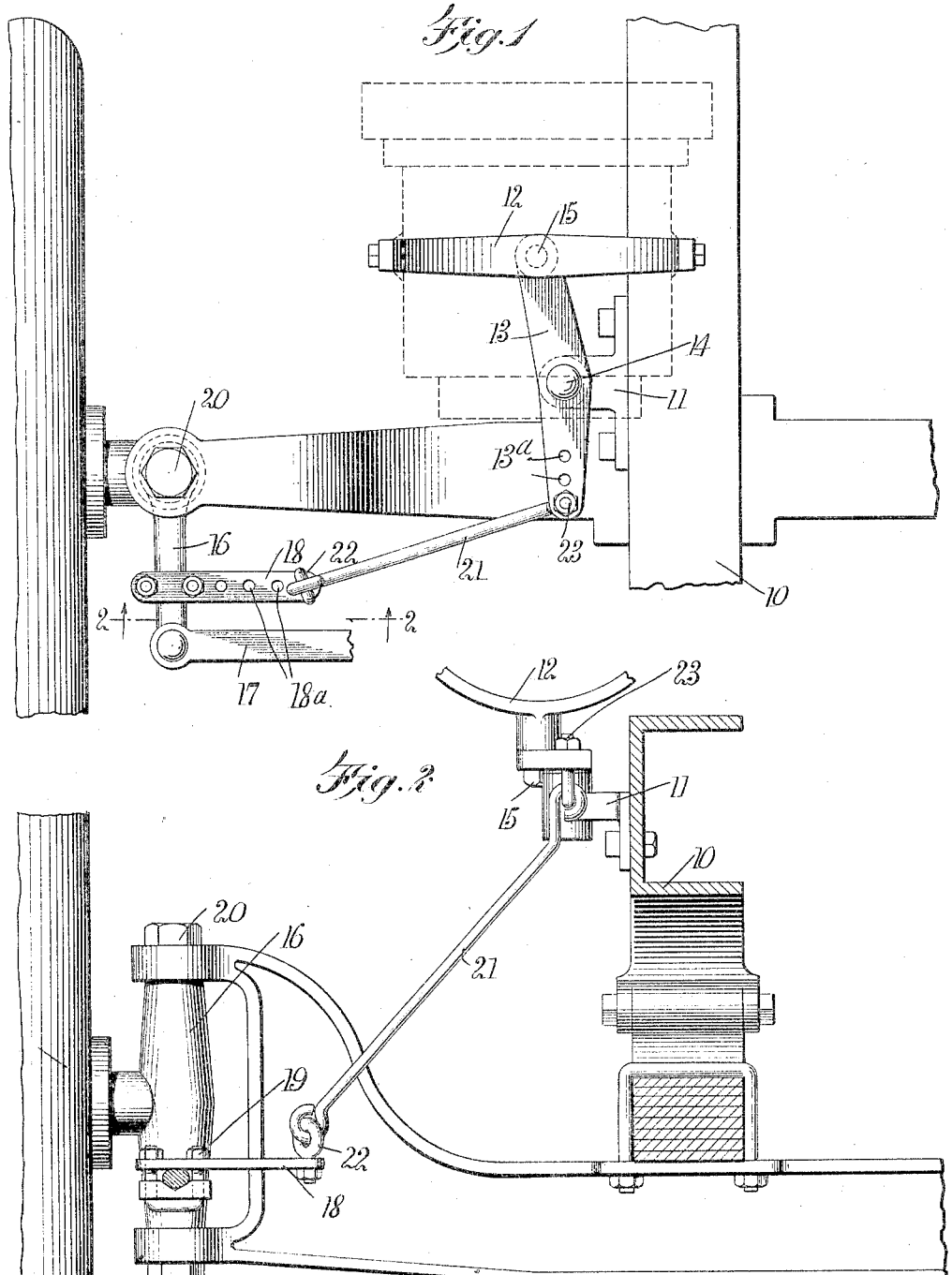

ARLEIGH C. HENDRY, OF HARPERSFIELD, NEW YORK.

DIRIGIBLE HEADLIGHT.

1,081,113.  Specification of Letters Patent.   Patented Dec. 9, 1913.

Application filed April 2, 1912. Serial No. 687,965.

*To all whom it may concern:*

Be it known that I, ARLEIGH C. HENDRY, a citizen of the United States, and a resident of Harpersfield, in the county of Delaware and State of New York, have invented a new and Improved Dirigible Headlight, of which the following is a full, clear, and exact description.

This invention relates to apparatus for connecting a headlight or headlights to a moving vehicle of any description, having particular reference, however, to the headlights on automobiles whereby at least one of the lights will be caused automatically to be steered in unison with the steering apparatus of the vehicle so as to illuminate the roadway in the direction in which the vehicle is to be operated at a turn.

Automobiles, as usually constructed, are provided with several headlights, some of which may be equipped with this improvement for the purpose set forth, and others, if desired, may be provided with stationary mountings so that a portion of the light may be directed substantially in line with the vehicle body.

The invention consists in the peculiar features of construction hereinafter fully described and claimed and illustrated in the accompanying drawings, in which—

Figure 1 is a plan view of the improvement in the position which it occupies when attached to an automobile frame; and Fig. 2 is a vertical transverse section of said frame and indicating the device in elevation, the view being substantially on the line 2—2 of Fig. 1.

In carrying this improvement into practice, I provide a minimum number of separate parts which are adapted to be connected to practically every well known type of automobile, the only tools required for the purpose being those ordinarily carried in the automobile kit. Furthermore, the construction is such that it is not likely to become out of order or interfered with by the ordinary operation of the machine.

To the ordinary frame 10 of an automobile is connected a bracket or lug 11, into the vertical eye or bore of which the usual lamp bracket or yoke 12 is secured. I provide a lever 13 and pivot it at a point intermediate its ends on said lug 11 by means of a bolt 14. The lamp yoke 12 is connected rigidly at 15 to one end of said lever 13, so that the lamp will swing bodily with the lever around the pivot 14.

At 16 is indicated a conventional steering knuckle and I clamp thereto, between the knuckle and the connecting bar 17, a plate 18 having a series of holes 18ª. The said plate 18, by means of a U-bolt 19, may be secured at any suitable distance from the axis 20 of the knuckle. A rod 21 is connected at one end to the plate 18 by means of an eye-bolt 22 and at the other end to the lever 13 by means of an eye-bolt 23, the latter being adapted to be secured in any one of a series of holes 13ª in said lever. By virtue of said series of holes 13ª and 18ª, a large latitude of adjustments is possible according to various machines or special requirements.

Having thus described my invention, what I claim as new and desire to secure by Letters Patent is:

The herein described dirigible headlight comprising, in combination, a stationary frame bracket, a lever pivoted in a horizontal plane on said bracket on a vertical axis and having at one end a series of holes, a lamp yoke carried rigidly and bodily at the other end of said lever, a steering knuckle, a horizontal plate connected to said knuckle and adjustable toward or from the axis of said knuckle, said plate extending toward the aforesaid lever but in a plane below the plane of the lever and having a series of holes, a pair of eye bolts adjustably connected respectively in any of said bar and lever holes, and an upwardly inclined connecting bar having loose pivotal connection with said eye bolts, substantially as and for the purposes set forth.

In testimony whereof I have signed my name to this specification in the presence of two subscribing witnesses.

ARLEIGH C. HENDRY.

Witnesses:
C. M. HENDRY,
FLORA SCOTT.

Copies of this patent may be obtained for five cents each, by addressing the "Commissioner of Patents, Washington, D. C."